US007866599B2

(12) United States Patent
Elvin

(10) Patent No.: US 7,866,599 B2
(45) Date of Patent: Jan. 11, 2011

(54) INTEGRATED INWARD TURNING INLETS AND NOZZLES FOR HYPERSONIC AIR VEHICLES

(75) Inventor: John D. Elvin, Santa Clarita, CA (US)

(73) Assignee: Lockheed-Martin Corporation, Bethesda, MD (US)

( * ) Notice: Subject to any disclaimer, the term of this patent is extended or adjusted under 35 U.S.C. 154(b) by 1175 days.

(21) Appl. No.: 11/354,358

(22) Filed: Feb. 14, 2006

(65) Prior Publication Data

US 2007/0187550 A1     Aug. 16, 2007

(51) Int. Cl.
    *B64D 33/02*     (2006.01)
(52) U.S. Cl. .................................................. 244/53 B
(58) Field of Classification Search ............... 244/53 B, 244/53 R, 36, 62, 73 R; 137/15.1, 15.2
See application file for complete search history.

(56) References Cited

U.S. PATENT DOCUMENTS

| 3,054,255 | A | * | 9/1962 | Stratford | ..................... 137/15.1 |
| 4,265,416 | A | * | 5/1981 | Jackson et al. | ................... 244/2 |
| 5,337,975 | A | * | 8/1994 | Peinemann | ............... 244/53 B |
| 5,586,735 | A | * | 12/1996 | Falempin et al. | .......... 244/53 B |
| 6,232,922 | B1 | | 5/2001 | McIntosh | |
| 6,473,025 | B2 | | 10/2002 | Stolarcyzk et al. | |
| 6,628,231 | B2 | | 9/2003 | Mayersak | |
| 6,634,594 | B1 | * | 10/2003 | Bowcutt | ..................... 244/35 A |
| 6,793,175 | B1 | * | 9/2004 | Sanders et al. | ............. 244/53 B |
| 2007/0028594 | A1 | * | 2/2007 | Arata | ........................... 60/224 |

OTHER PUBLICATIONS

M. K. Smart, Design of Three-Dimensional Hypersonic Inlets with Rectangular to Elliptical Shape Transition, Jun. 1999, vol. 15, All pages. http://hapb-www.larc.nasa.gov/Public/Documents/Aiaa-5459454.pdf.*
Frederick S. Billig et al., Streamline Tracing; Technique for Designing Hypersonic Vehicles, Journal of Propulsion and Power, vol. 16, No. 3, pp. 465-471, May-Jun. 2000.
Daniel E.F. Barkmeyer et al., Inverse Waverider Design for Inward Turning Inlets, American Institute of Aeronautics and Astronautics, AIAA 2005-3915, pp. 1-11, Jul. 10-13, 2005. Tucson, Arizona.
Dr. Patrick E. Rodi, The Osculating Flowfield Method of Waverider Geometry Generation, American Instittue of Aeronautics and Astronautics, AIAA 2005-0511, pp. 1-8, Jan. 10-13, 2005, Reno, Nevada.

(Continued)

*Primary Examiner*—Timothy D Collins
*Assistant Examiner*—Valentina Xavier
(74) *Attorney, Agent, or Firm*—Koestner Bertani LLP; Mary Jo Bertani

(57) ABSTRACT

A hypersonic waverider aircraft is disclosed that includes a first engine and an inlet including a throat. The inlet is configured to generate three-dimensional flow compression during hypersonic flight with a weak shock wave that begins at the leading edge surfaces of the inlet and coalesces ahead of the throat, and a weak shock wave that begins at the point of coalescence of the weak shock wave and extends to the throat. The inlet includes a v-shaped lip open to freestream airflow in one side of the inlet.

18 Claims, 7 Drawing Sheets

OTHER PUBLICATIONS

European Extended Search Report dated Nov. 13, 2009.

Wie Van D M et al., "Applications of Busemann Inlet Designs for Flight at Hypersonic Speeds", AIAA/AHS/ASEE Aerospace Design Conference, XX, XX, Feb. 1, 1992, pp. 1-12, XP008032502.

Billig F S et al., "Design and Analysis of Streamline Traced Hypersonic Inlets", International Space Planes and Hypersonic Systems and Technologies Conference and Weakly Ionized Gases Workshop, AIAA, Norfolk, VA, US, Nov. 1, 1999, pp. 1-12, XP009072415.

Billig F S et al., "Streamline Tracing: Technique for Designing Hypersonic Vehicles" May 1, 2000, Journal of Propulsion and Power, American Institute of Aeronautics and Astronautics. New York, US, pp. 465-471, XP000935377 ISSN: 0748-4658.

Drayna T W et al., "Hypersonic Inward Turning Inlets: Design and Optimization", Collection of Technical Papers; 44th AIAA Aerospace Sciences Meeting (44th AIAA Aerospace Sciences Meeting 2006-Jan. 9, 2006 to Jan. 12, 2006—Reno, NV) American Institute of Aeronautics and Astronautics, US, Jan. 9, 2006, pp. 3538-3548, XP009125195 ISBN: 978-1-56347-807-9.

Walsh P C et al., "Boundary-Layer Correction for the Busemann Hypersonic Air Inlet" Canadian Aeronautics and Space Journal, Canadian Aeronautics and Space Institute, Ottawa, CA, vol. 49, No. 1, Mar. 1, 2003, pp. 11-17, XP002399238, ISSN: 0008-2821.

Billig Frederick S et al., "Comparison of Planar and Axisymmetric Flowpaths for Hydrogen Fueled Space Access Vehicles," AIAA/SAE/ASME/ASEE Joint Propulsion Conference and Exhibit, XX, XX, Jan. 1, 2003, pp. 1-12, XP009072445.

* cited by examiner

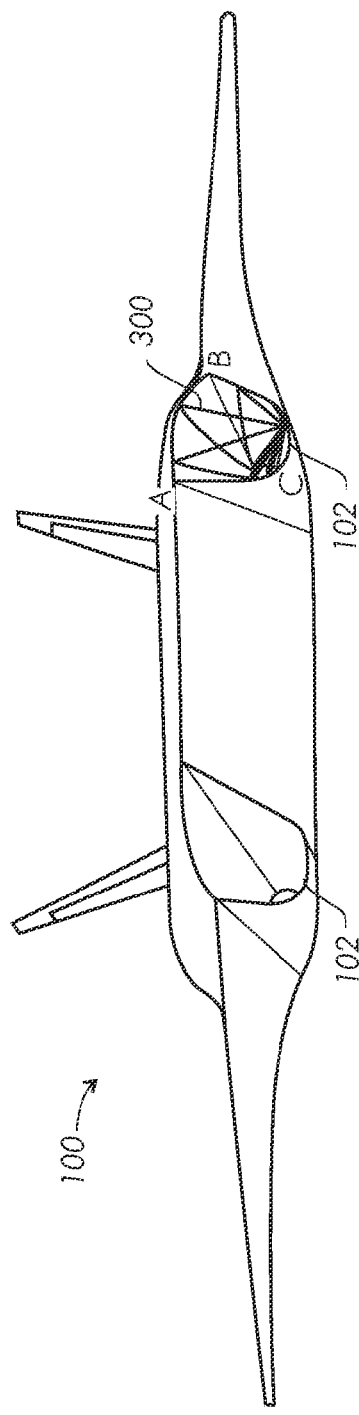
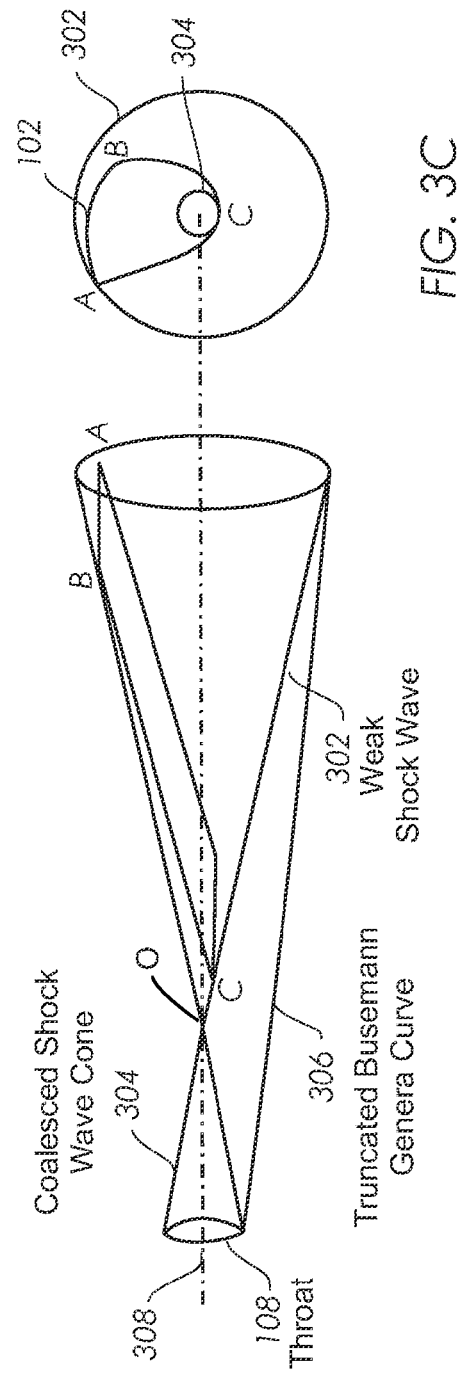
FIG. 3A
FIG. 3B
FIG. 3C

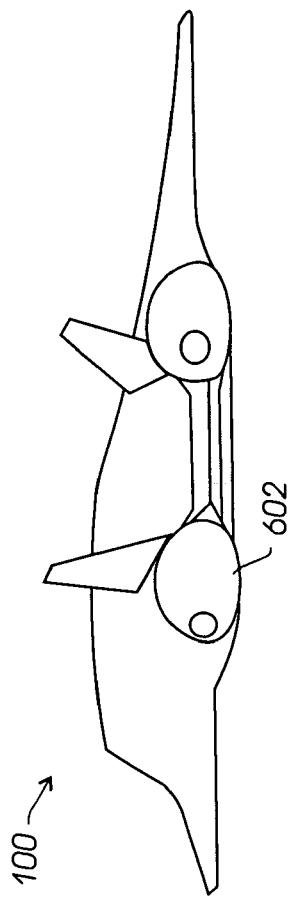
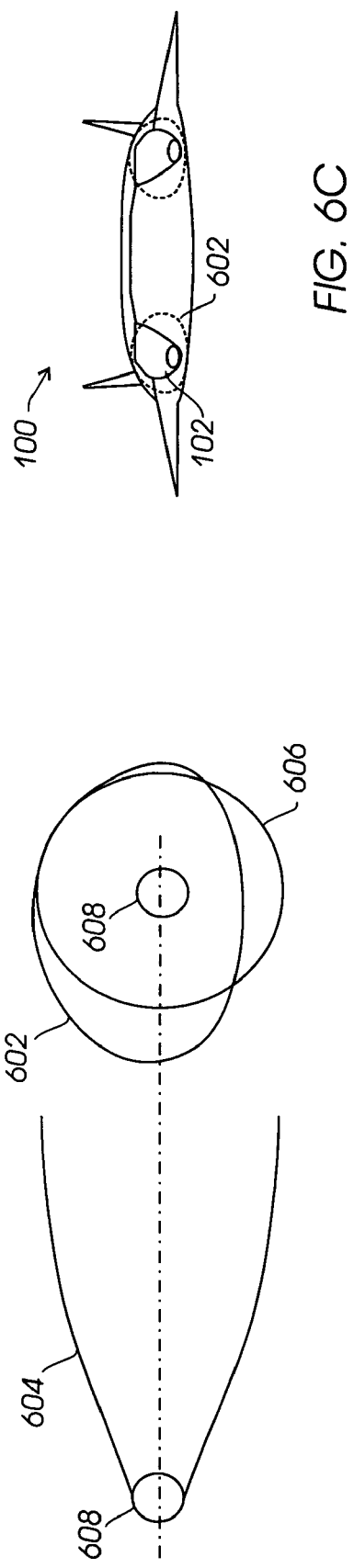
FIG. 6A
FIG. 6B
FIG. 6C

INTEGRATED INWARD TURNING INLETS AND NOZZLES FOR HYPERSONIC AIR VEHICLES

BACKGROUND

The pursuit of high lift-to-drag ratio (L/D) hypersonic bodies has been underway for decades. Vehicle performance can be greatly increased by taking advantage of the hyperbolic nature of an invisicid flowfield. One such example of this approach is the waverider family of vehicles. Waveriders effectively increase the lift generated by a vehicle moving through the air at high speed by riding the shock wave that the vehicle itself has created.

Existing hypersonic vehicles have two dimensional arrayed RAM/SCRAMjet engines which integrate poorly with high performance waverider vehicles, have marginal performance, and are historically heavy. Typical hypersonic vehicles attempted to overcome the poor integration and heavy engine weight by scaling up the vehicle to unrealistic sizes. The inherent performance and design issues of these vary large vehicles have never been solved.

It is therefore desirable to provide a low-weight, high-performance hypersonic vehicle.

SUMMARY

In some embodiments, a hypersonic waverider aircraft is disclosed that includes a first engine and an inlet including a throat. The inlet is configured to generate three-dimensional flow compression during hypersonic flight with a weak shock wave that begins at the leading edge surfaces of the inlet and coalesces ahead of the throat, and a weak shock wave that begins at the point of coalescence of the weak shock wave and extends to the throat. The inlet includes a v-shaped lip open to freestream airflow in one side of the inlet.

In other embodiments, a method of forming an engine inlet for a hypersonic waverider aircraft is disclosed. The aircraft includes an engine and an integrated wing-body, and the inlet includes a throat. The method includes revolving a streamline from a shock wave extending from a leading edge of the inlet to the throat, wherein the revolved streamline forms a substantially conical shock wave ahead of the throat. The shape of the inlet is defined by superimposing the conical shock wave within the shape of the wing-body. The shape of the inlet is modified to capture desired airflow while retaining upper lifting surface shape of the wing-body by including a v-shaped lip cut out of the underside of the inlet.

In further embodiments, an engine includes an inlet. The inlet includes a throat and is configured to generate three-dimensional flow compression with a shock at the throat during hypersonic flight. The inlet is further configured to be asymmetrical about a longitudinal axis of an engine.

In still further embodiments, a propulsion system includes a first engine capable of delivering thrust for hypersonic cruise flight; and a second engine mounted adjacent to the first engine. The first engine and the second engine are configured to share an inlet.

BRIEF DESCRIPTION OF THE FIGURES

FIG. 3A shows an embodiment of aircraft of FIG. 1E with shock waves in an inlet;

FIGS. 3B-3C show an embodiment conical shock waves used to configure the inlets of the aircraft of FIGS. 1A-1E;

FIGS. 6A-6C show an embodiment of an aircraft with integrated nozzles;

DETAILED DESCRIPTION OF THE FIGURES

FIGS. 1A-1E shows top perspective, bottom perspective, front, bottom, and side views, respectively, of an embodiment of a hypersonic waverider aircraft 100 with integrated inward turning inlets 102 and nozzles 104. Aircraft 100 can have any suitable body shape to achieve desired performance during hypersonic cruise as well as flight at lower speeds and landing. Aerodynamic and propulsive performance of traditional waverider designs have very strong adverse coupling. Inward turning inlets 102 decouple this dependency and optimize performance by dramatically reducing the vehicle height and airframe weight, and improving operability and maintainability.

An "inward-turning" flowpath means that the inlet focuses the flow towards the center or throat of an engine, which has a circular cross-section. The flowpath is therefore three-dimensional, instead of the rectangular two-dimensional cross-section of previous hypersonic designs.

Figure 1D:
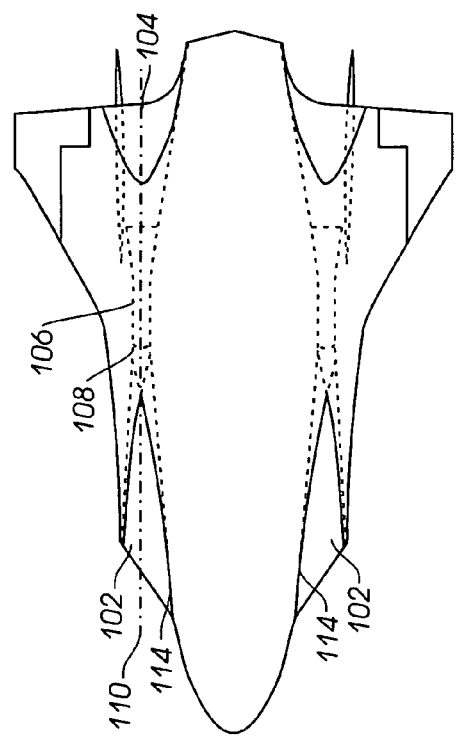
FIGS. 1A-1E shows top perspective, bottom perspective, front, bottom, and side views, respectively, of an embodiment of a hypersonic waverider aircraft.
Figure 1E:
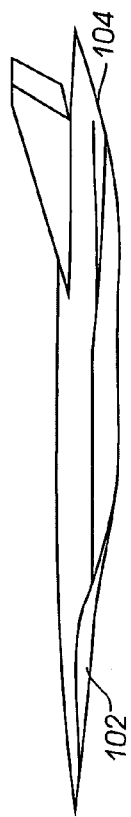
Figure 1A:
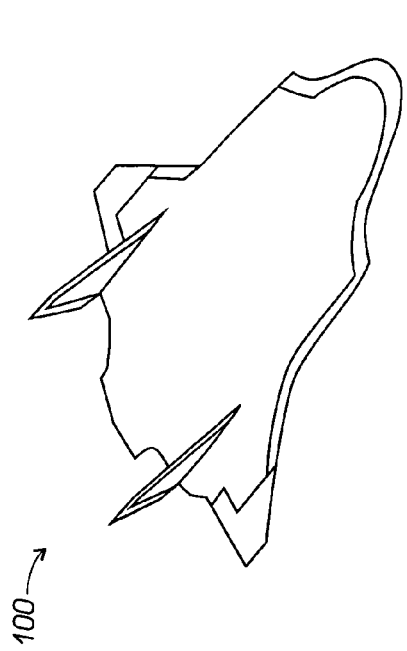
Figure 1B:
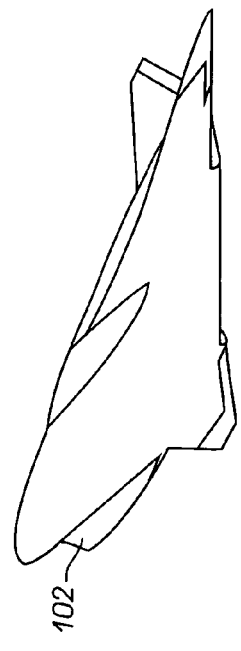
Figure 1C:
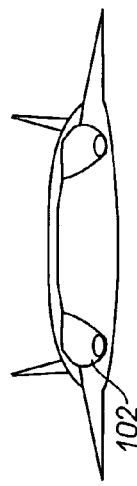
Figure 2:
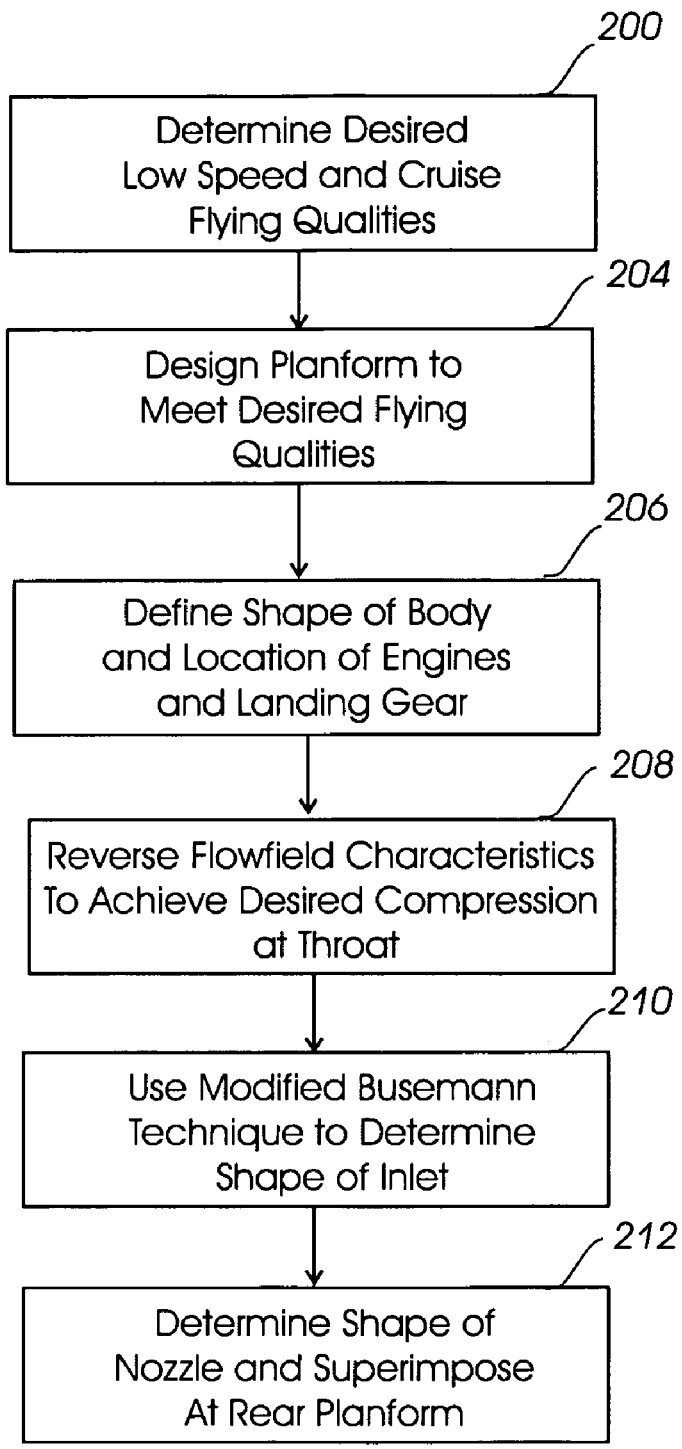
FIG. 2 shows an embodiment of a process for configuring aircraft with inward turning inlets.

FIG. 1D shows an outline of engine 106 including a throat 108 around a longitudinal axis 110 of engine 106. Throat 108 is generally the area of inlet 102 with the smallest cross-section. Inlet 102 is configured to generate three-dimensional flow compression during hypersonic flight with a weak shock 112 that begins at the leading edge surfaces of inlet 102 and coalesces ahead of throat 108, and a strong shock that begins at the point of coalescence of weak shock wave and extends to throat 108. In order to provide the desire airflow at throat 108, inlet 102 typically includes a v-shaped lip 114 open to free stream airflow in one side of inlet 102. The inlet capture area defined by the leading edges of inlet 102 is determined based on the thrust required to meet the design cruise speed of aircraft 100.

Referring to FIGS. 1A-1E and 2, an embodiment of a process for configuring aircraft 100 with inward turning inlets 102 is shown. Process 200 includes determining the desired low speed and cruise flying qualities for aircraft 100. The flying qualities desired typically depend on the mission for which aircraft 100 will be used. Determining factors can include range, speed, vehicle weight, and landing distance, among others. Once the flying qualities are determined, process 204 can include defining a planform for aircraft 102 to achieve the desired flying qualities. At this stage, preliminary locations for major structural features such as engines, landing gear, and fuel tanks can be determined in process 206.

Once the shape of aircraft 100 is determined, the location and shape of inlet 102 can be determined based on the planform and thickness of the wing-body combination of aircraft 100. The flowfield desired at throat 108 is defined by the performance or thrust required to achieve the desired flying qualities. Knowing the flowfield desired at throat 108, process 208 includes reversing flowfield characteristics starting at throat 108 to determine the shape of inlet 102 required to achieve the desired flowfield.

Process 210 includes using a modified Busemann technique to determine the shape of inlet 102. A modified Busemann inlet flowfield 300 is a conical, inward-turning, axisymmetric flow field that terminates in conical shock wave 302. At the design Mach number, shock waves 302 emanating from the internal surface of inlet 102 coalesce at the apex, O, of conical shock wave 302. Flow conditions along shock wave 302 are constant in isentropic compression.

To illustrate techniques used in processes 208 and 210, FIGS. 3A-3C show an embodiment of aircraft 100 with inlets 102. To find the shock that alters the flow as needed, the inlet flowfield is divided into n discrete streamtubes 300 revolved radially around throat 108. Shock wave 302 extends from the leading edge, or lip, of inlet 102 to a point ahead of throat 108. Shock wave 302 coalesces and generates conical shock wave 304. Conical shock wave 304 converts the flow to the conditions required at throat 108.

FIGS. 3B and 3C show the capture area of inlet 102 superimposed on the required capture area defined by conical shock wave 302. The shape of inlet 102 is further defined by the leading edge planform and depth, or thickness, of aircraft 100. The shape of inlet 102 can be determined by the intersection of the planform of aircraft 100 and shock waves 302, 304 rotated about throat 108. The opening of inlet 102 and the shape of lip 114 is then adjusted to conform to the desired planform and thickness of aircraft 100. Note that in order to conform to the planform and thickness of aircraft 100, the shape of inlet 102 can be asymmetrical about longitudinal axis 206 of engine 106.

The shape of conical shock wave 302 required to capture the desired amount of airflow can be modified to be asymmetrical about a longitudinal axis 308 of the engine 106 so that inlet 102 can be accommodated between the upper and lower lifting surface of aircraft 100. Typically, the underside of inlet 102 includes v-shaped lip 114 (FIGS. 1D, 1E) cut out of the underside of inlet 102 to achieve the desired capture area.

Figure 4A:
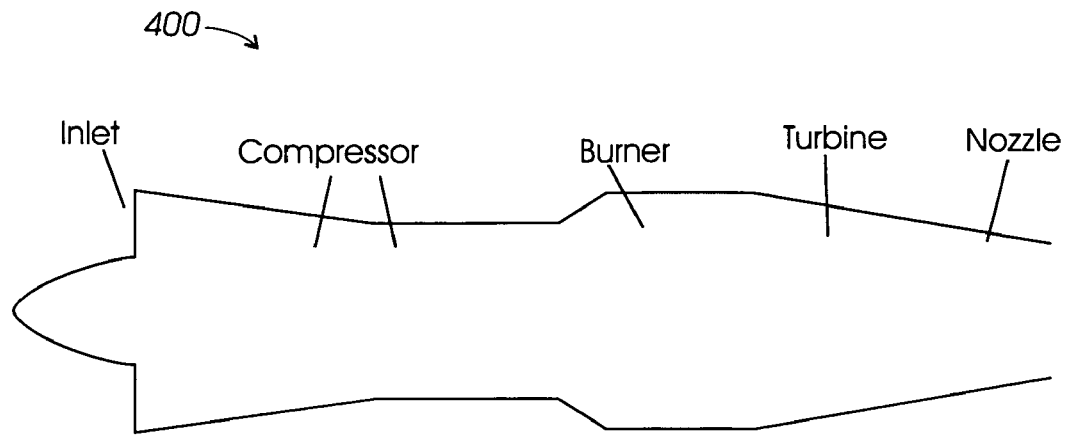
FIG. 4A shows an embodiment of a turbojet engine that can be included in the aircraft of FIGS. 1A-1E.

In some embodiments, engine 106 can include one or more engines. At speeds up to about Mach 3, aircraft 100 can fly with a conventional turbojet engine. As shown in FIG. 4A, a turbojet engine 400 includes five basic sections: an inlet through which air enters; one or more compressor stages that raise the pressure of the air flow; a combustor that injects and ignites fuel mixed with the compressed air flow; a turbine where the hot air flows past small blades that power the compressor(s); and a nozzle through which the exhaust expands to provide thrust.

A compressor and turbine are not required at supersonic speeds because of the high speed/pressure of air entering the engine. As the Mach number increases, the temperature rise inside the engine that results from the deceleration of the air flow reduces the combustion efficiency and therefore the thrust. Supersonic combustion ramjet 402, or scramjet engines 404, shown in FIGS. 4B and 4C, respectively, are more suitable for hypersonic speeds, as the air enters the engine at supersonic speeds and remains supersonic throughout the combustion process. In contrast, in the conventional ramjet engine 402, the flow decelerates after it enters the engine.

Figure 4B:
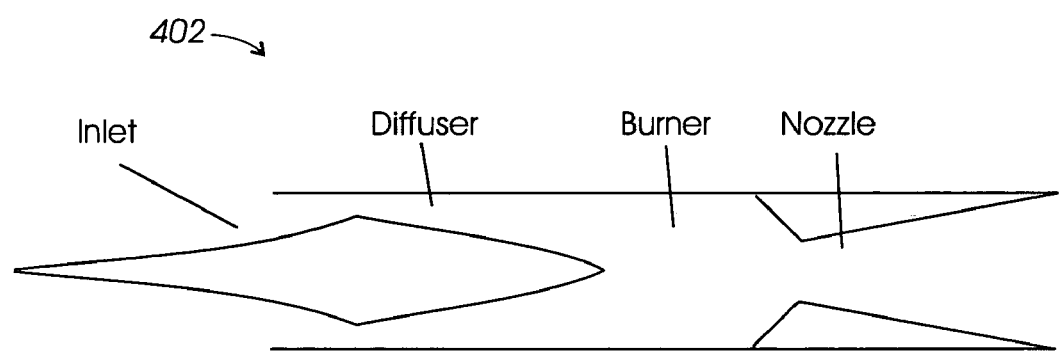
FIG. 4B shows an embodiment of a ramjet engine that can be included in the aircraft of FIGS. 1A-1E.
Figure 4C:
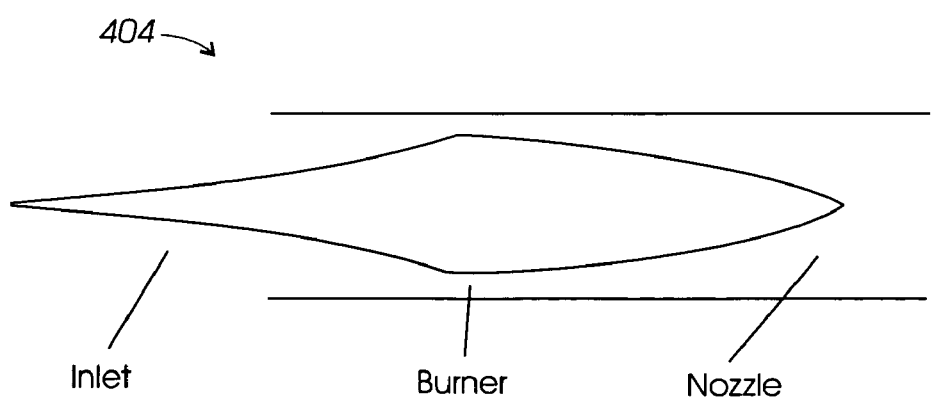
FIG. 4C shows an embodiment of a scramjet engine that can be included in the aircraft of FIGS. 1A-1E.

Ramjet 402 shown in FIG. 4B is an air-breathing engine without a compressor or a turbine, but includes an inlet, a combustor, and a nozzle. Like a conventional ramjet engine 402, scramjet engine 404 includes a constricted tube through which air is compressed, fuel is combusted, and the exhaust is vented at higher speed than the intake air. Scramjet engine 404 requires extremely high speed airflow to function and requires acceleration to supersonic speed before it can be started.

In some embodiments an engine used for subsonic and low supersonic speed, such as turbojet engine 400, can be mounted adjacent another engine that is used for hypersonic speed, such as ramjet 402 or scramjet 404. The first and second engines can be configured to share the same inlet. In some embodiments, a flow diverter structure can be included in inlet 102 to allow air flow to one engine or the other, depending on the speed of aircraft 100.

Figure 5A:
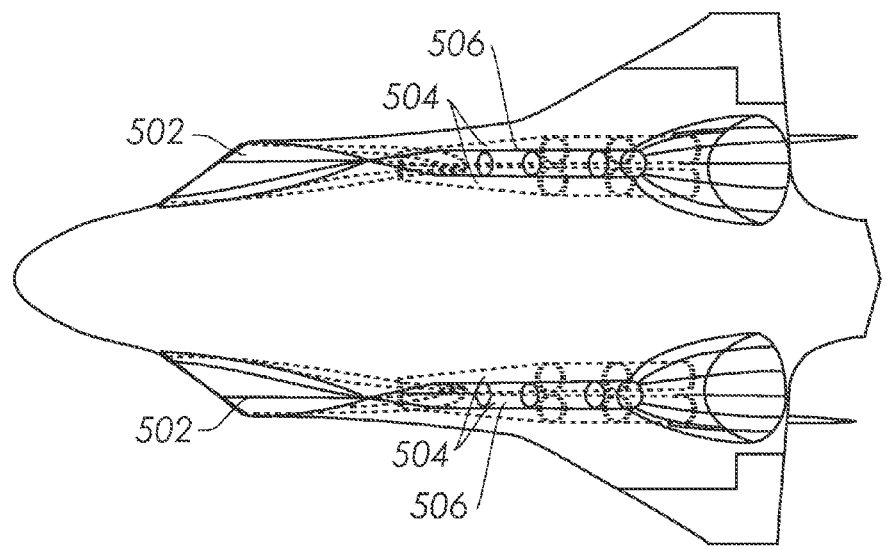
FIG. 5A shows a bottom view of an embodiment of inward turning inlets integrated with an aircraft.
Figure 5B:
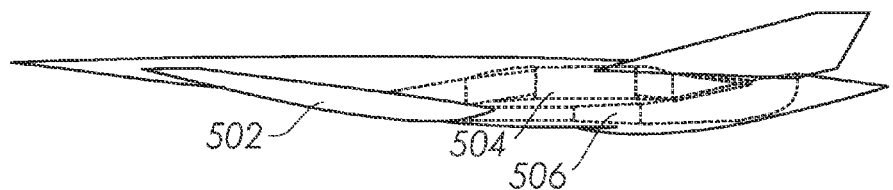
FIG. 5B shows a side view of an embodiment of inward turning inlets integrated with an aircraft.

FIGS. 5A and 5B show an embodiment of inward turning inlets 502 integrated with aircraft 500. Twin turbojet engines 504 (shown in dashed lines) are positioned above each scramjet engine 506 on both sides of aircraft 100. A single inward turning inlet 502 is configured to supply air flow to all engines 504, 506 on either side of aircraft 500. A structural feature (not shown), such as a movable flap, ramp, door, or other suitable structure can be included to divert air flow between different types of engines 504, 506 at appropriate speeds. For instance, the diverter can be operated to supply air flow to twin turbojet engines 504 during flight at subsonic and low supersonic speeds. Once airspeed reaches a level at which a ramjet or scramjet engine can operate, the diverter can be switched to supply airflow to ramjet/scramjet engine 506.

Referring again to FIG. 2, process 212 can include determining the shape of a nozzle once the shape of the inlet 102 is defined. The contour of the nozzle is typically based on desired thrust. FIGS. 6A-6C show an embodiment of aircraft 100 with nozzles 602. In some embodiments, a graph of theoretically "perfect" expansion curves based on desired thrust coefficients can be used to determine a contour 604 of the side walls of nozzle 602. The ideal exit area 606 of nozzle 602 is defined by contour 604.

Process 212 can include revolving the contour 604 about throat 608 of nozzle 604 to form an ideal nozzle shape. The ideal nozzle shape can then be superimposed within the shape of aircraft 100 to determine the shape of nozzle 602, which is constrained by the shape of the wing-body combination, that is, the planform and thickness of aircraft 100.

The resulting shape of nozzle 602 can be asymmetrical about the longitudinal axis of engine 106 once nozzle 602 is integrated into the shape of the wing-body and modified to provide the desired exit area 606 of an ideal nozzle.

Note that the embodiment of hypersonic waverider aircraft 100 shown includes an integrated wing-body combination, where the wings are fared smoothly into the body. Other suitable configurations for the shape of aircraft 100 can used, however.

The design of high lift-to-drag ratio (LD) hypersonic bodies has two major factors to consider. First, the invisicid drag is high due to the shock losses behind the shock waves formed at high Mach numbers. Second, the skin friction drag is high due to the high associated velocities. By taking advantage of the hyperbolic nature of the invisicid flowfield, vehicle performance can be greatly increased. One such example of this approach is the waverider family of vehicles, such as aircraft 100, 500. Waveriders effectively increase the lift generated by a vehicle moving through the air at high speed by riding the shock wave that the vehicle itself has created.

Methods for designing waverider configurations include the Conical Waverider Method and the Osculating Flowfield Method. The Conical method limits vehicle L/D ratios. In order to increase the UD of waveriders at useful lift coefficients, the Osculating Cone Method was developed to permit a more general definition of the possible shock wave shapes and gain significant improvement in waverider L/D.

In the Osculating Cone Method, a series of planes are created that are normal to the local shock wave shape at the trailing edge of the waverider geometry. On each of these osculating planes, a conical flowfield is imposed from the solution of the Taylor-Maccoll equations, for an assumed cone angle and freestream Mach number. As a result, the entire flowfield is known within a given osculating plane. A number of procedures to define the waverider configuration are possible. One such procedure is to prescribe the upper surface trace and the shock wave shape trace on the baseplane. The leading edge of the waverider is then found by knowing the intersection point between each osculating plane and the upper surface, at the shock angle generated by the local conical flowfield on that osculating plane. With the leading edge defined, the waverider lower surface can be created by tracing streamlines from the leading edge point within the osculating plane.

An extension of the Osculating Cone Method is the Osculating Flowfield Method developed by Dr. Patrick Rodi, as disclosed in his publication entitled "The Osculating Flowfield Method of Waverider Geometry Generation", American Institute of Aeronautics and Astronautics Paper 2005-0511, January 2005.

Figure 7:
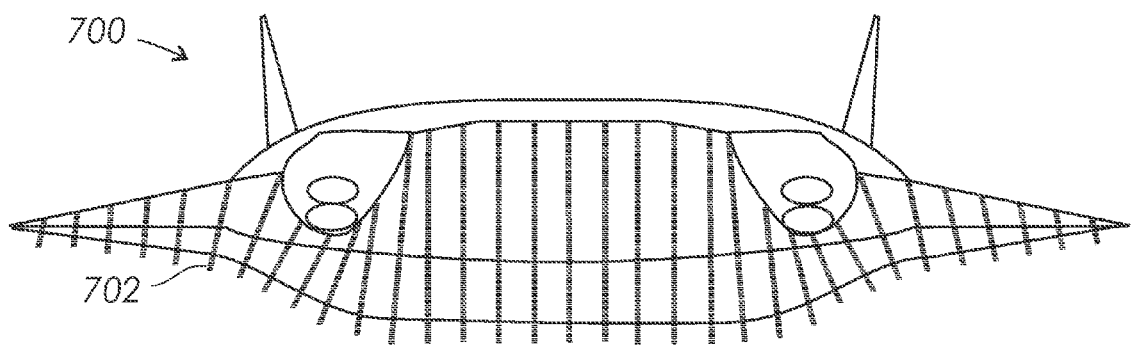
FIG. 7 shows osculating flowfields superimposed on an embodiment of a waverider aircraft.

FIG. 7 shows flowfields superimposed on an embodiment of waverider aircraft 700. The Osculating Flowfield Method permits a generalized flowfield (e.g. concave or convex power law bodies) on the osculating planes 702. The additional flexibility in vehicle design permits certain planes feeding a propulsion system to be designed for increased pressure recovery, while other planes can be adjusted to improve aerodynamic performance.

The flowfield imposed on each osculating plane 702 may be one of a wide variety of alternative flowfields. The constraints on the imposed flowfields are that the baseplane shock wave trace is met and that the crossflow terms (i.e. from one plane to the other) remain small. The constraint on crossflow becomes less restrictive as the Mach number is increased due to the high momentum of the freestream flow.

In some embodiments, a series of "power law body"-based flowfields are employed on each osculating plane 702; where the local power law body radius, r, is a function of position along the body defined by, $$r/r_b = (x/L)^n$$

where $r_b$ is the radius of the power law body at the base of the body, x is the vehicle axis measured from the nose and moving towards the base, L is the total body length, and n is the exponent in the power law body expression. Typically, the exponent varies between $0.75 \leq n \leq 1.1$. A power law body-based flowfield can be selected for use on the osculating planes due to the pressure drag reduction observed in power law bodies when compared to cones.

Since the power law body flowfields cannot be solved in a simple analytical manner (as is the case with the Taylor-Maccoll solutions for the Osculating Cone Method), a series of Euler computations are first conducted to quantify the power law-body flowfields over the range of exponents, cone angles, and Mach numbers of interest.

Once these Euler solutions have been generated, the required flowfield information is stored and called upon whenever needed. Consequently the Euler computations are conducted once, as the code is being developed, after which a multitude of waverider geometries can be created over a range of conditions without further need of additional Euler computations.

Waveriders configurations can be generated using the upper surface and shock wave traces in the baseplane of the flowfield to define and orientate the osculating planes 702. However, the value of the power law body exponent is now a user defined independent variable. In some implementations, the prescribed exponent distribution is a function of spanwise coordinate, Y.

In addition to reductions in pressure drag, the Osculating Flowfield Method permits power law exponents greater than unity to create local waverider features to form more efficient inlets for air-breathing propulsion systems than is possible with conical constructions. Such exponent values produce geometries that are closer to an isentropic geometry for better inlet pressure recovery. Consequently, the new method permits an optimization of the flowfield mix to increase both propulsion and aerodynamic efficiency.

Figure 8:
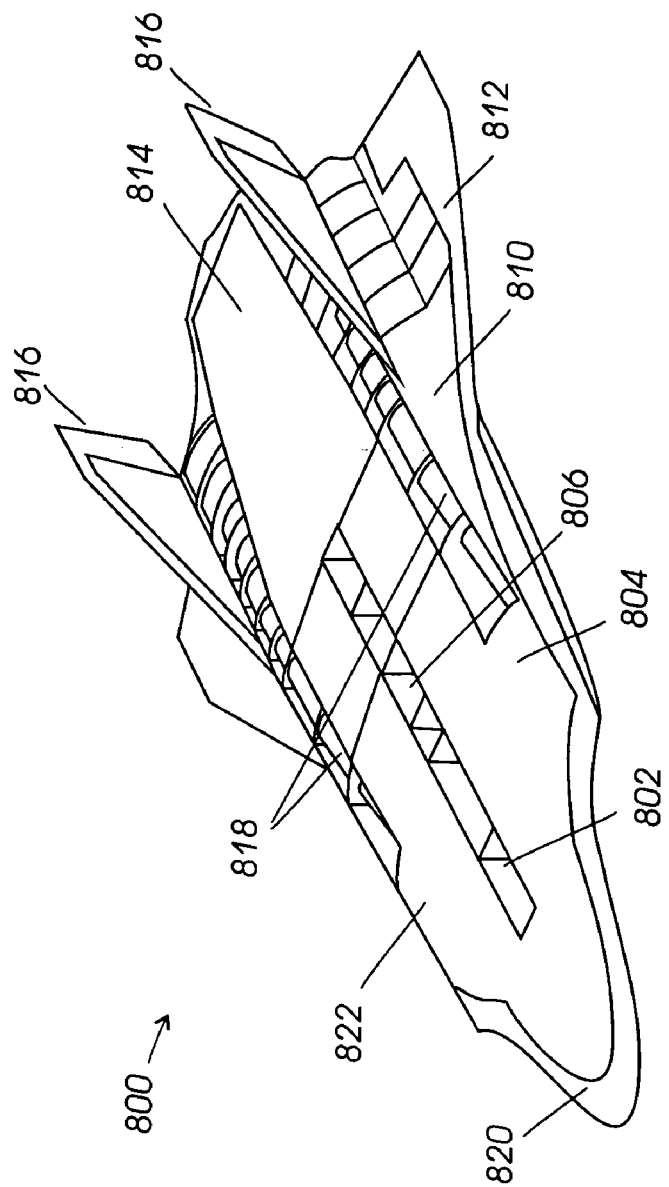
FIG. 8 shows an embodiment of a structural layout of a waverider aircraft configured with integrated inward turning inlets and nozzles.

FIG. 8 shows an embodiment of a structural configuration for a waverider aircraft 800 that includes inward turning inlets and nozzles. Aircraft 802 is further configured with nose gear bay 802 positioned along a centerline longitudinal axis. Fuel tanks 804 are positioned on either side of nose gear bay 802, as well as other locations in aircraft, such as along the sides of combined cycle propulsion systems 808 that fare from body 810 to wings 812. Additional structure and/or fuel can be located in bay 814, which are located between twin vertical stabilizers 816.

In some applications, aircraft 800 can be configured with one or more weapon bays 818 capable of storing a variety of different types of equipment. Leading edges 820 of aircraft 800 can be coated with a substance capable of withstanding very high temperatures at hypersonic speeds. The skin panels 822 can also be coated with heat resistant substances, as required.

An inward turning RAM/SCRAMjet engine is integrated with an osculating flowfield waverider to improve hypersonic engine integration, hypersonic propulsive performance, and reduce gross weight. A three dimensional inward turning RAM/SCRAMjet engine compresses the airflow in a more efficient manner and features a round combustion chamber which is lighter and easily integrated into propellant tanks. The integration with an osculating flowfield waverider reduces aerodynamic drag and increases excess thrust. Traditional designs have a very strong adverse coupling of aerodynamic and propulsive performance. The inward turning concept decouples this dependency and optimizes both aerodynamic and propulsive performance. This enables a shorter more efficient inlet, and dramatically reduces the vehicle height, resulting in reduced airframe weight and improved operability and maintainability.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

I claim:

1. A hypersonic waverider aircraft, comprising:
a first engine;
an inlet including a throat, the inlet being configured to generate three-dimensional flow compression during hypersonic flight with a weak shock wave that begins at the leading edge surfaces of the inlet and coalesces ahead of the throat, and a weak shock wave that begins at the point of coalescence of the weak shock wave and extends to the throat, wherein
at least a portion of the inlet is asymmetrical about a longitudinal axis of the engine, and
the underside of the inlet includes a v-shaped leading edge cut out of the underside of the inlet so that the shape of a conical shock wave required to capture the desired amount of airflow is asymmetrical about the longitudinal axis of the first engine.

2. The hypersonic waverider aircraft of claim 1 wherein the engine is a scramjet engine.

3. The hypersonic waverider aircraft of claim 1 further comprising:
a turbojet engine mounted above the first engine.

4. The hypersonic waverider aircraft of claim 1 further comprising:
an integrated wing-body; and
an asymmetrical nozzle integrated into the shape of the wing-body.

5. The hypersonic waverider aircraft of claim 1 further comprising:
an integrated wing-body, wherein the shape of the inlet is further defined by and integrated with the planform and thickness of the wing-body.

6. The hypersonic waverider aircraft of claim 1 further comprising:
a second engine mounted above the first engine.

7. The hypersonic waverider aircraft of claim 6 wherein the first engine is a scramjet engine, and the second engine is a turbojet engine.

8. A waverider aircraft comprising:
an engine including an inlet and a throat, the inlet being configured to generate three-dimensional flow compression with a shock at the throat during hypersonic flight, and the inlet is further configured to be asymmetrical about a longitudinal axis of the engine;
the inlet is configured to generate three-dimensional flow compression during hypersonic flight with a weak shock that begins at leading edge surfaces of the inlet and coalesces ahead of the throat, and a strong shock that begins at the point of coalescence of the weak shock wave and extends to the throat.

9. The aircraft of claim 8 wherein the inlet is integrated into the shape an aircraft and includes a v-shaped lip open to freestream airflow in one side of the inlet.

10. The aircraft of claim 9 wherein the engine is a scramjet engine.

11. The aircraft of claim 10 further comprising:
a turbojet engine mounted adjacent to the scramjet engine, wherein the turbojet engine and the scramjet engine are configured to share the inlet.

12. The aircraft of claim 8 further comprising:
a nozzle with a throat including a contour to achieve a desired thrust and modified to be asymmetrical to conform to a desired shape of an aircraft.

13. The aircraft of claim 8 further comprising:
an integrated wing-body, wherein the shape of the inlet is further defined by and integrated with the planform and thickness of the wing-body.

14. The aircraft of claim 13 further comprising a nozzle that is asymmetrical about the longitudinal axis of the engine.

15. An aircraft comprising:
a first engine capable of delivering thrust for hypersonic cruise flight;
a second engine mounted adjacent to the first engine, wherein the second engine delivers thrust at speeds below hypersonic cruise flight, and the first engine and the second engine are configured to share an inlet; and
the inlet includes a throat and generates three-dimensional inward-turning flow compression, and the inlet is further configured to be asymmetrical about longitudinal axes of the scramjet and turbojet engines.

16. The aircraft of claim 15 wherein the inlet is integrated into the shape of the aircraft and includes a v-shaped lip open to freestream airflow in one side of the inlet.

17. The aircraft of claim 15 wherein the inlet is configured to capture desired airflow while retaining upper lifting surface shape of a wing-body configuration of the aircraft and including a v-shaped lip cut out of the underside of the inlet.

18. The aircraft of claim 15 further comprising:
a nozzle with a throat including a contour to achieve a desired thrust and modified to be asymmetrical to conform to a desired shape of the aircraft.

* * * * *